(12) United States Patent
Veraza

(10) Patent No.: US 11,603,952 B2
(45) Date of Patent: Mar. 14, 2023

(54) IN-LINE QUICK CONNECTOR

(71) Applicant: COOPER-STANDARD AUTOMOTIVE, INC., Northville, MI (US)

(72) Inventor: Christian A. Veraza, Auburn Hills, MI (US)

(73) Assignee: Cooper-Standard Automotive, Inc., Northville, MI (US)

( * ) Notice: Subject to any disclaimer, the term of this patent is extended or adjusted under 35 U.S.C. 154(b) by 0 days.

(21) Appl. No.: 17/383,788

(22) Filed: Jul. 23, 2021

(65) Prior Publication Data

US 2023/0027286 A1 Jan. 26, 2023

(51) Int. Cl.
F16L 37/133 (2006.01)
F16L 37/084 (2006.01)

(52) U.S. Cl.
CPC ........... *F16L 37/133* (2013.01); *F16L 37/084* (2013.01)

(58) Field of Classification Search
CPC ..... F16L 37/127; F16L 37/133; F16L 37/084; F16L 37/0842; F16L 37/0847; F16L 37/096; F16L 37/098
USPC ....................................................... 285/322
See application file for complete search history.

(56) References Cited

U.S. PATENT DOCUMENTS

| | | |
|---|---|---|
| 3,944,261 A | 3/1976 | Reed |
| 4,423,892 A | 1/1984 | Bartholomew |
| 4,511,163 A | 4/1985 | Harris |
| 4,991,882 A | 2/1991 | Gahwiler |
| 4,994,048 A | 2/1991 | Metzger |
| 5,257,826 A | 11/1993 | Prassas |
| 5,284,369 A | 2/1994 | Kitamura |
| 5,356,183 A | 10/1994 | Cole |
| 5,498,042 A | 3/1996 | Dole |
| 5,573,280 A | 11/1996 | Salter |
| 5,586,791 A | 12/1996 | Kirchner |
| 5,653,475 A | 8/1997 | Scheyhing |
| 5,855,398 A | 1/1999 | Reinholz |
| 5,863,077 A | 1/1999 | Szabo |
| 5,876,071 A | 3/1999 | Aldridge |
| 5,934,713 A * | 8/1999 | Guest ................... F16L 37/0985 285/322 |
| 5,964,483 A | 10/1999 | Long |
| 6,113,151 A | 9/2000 | Beans |
| 6,231,084 B1 | 5/2001 | Hester |
| 6,302,451 B1 | 10/2001 | Olson |
| 6,540,264 B1 | 4/2003 | Yokoyama |
| 6,709,026 B2 | 3/2004 | Sausner |

(Continued)

FOREIGN PATENT DOCUMENTS

| | | |
|---|---|---|
| AU | 678981 B2 | 4/1994 |
| EP | 1800045 B1 | 3/2010 |

*Primary Examiner* — Zachary T Dragicevich
(74) *Attorney, Agent, or Firm* — James C. Paschall; Anthony Miologs; Paschall & Associates, LLC

(57) ABSTRACT

An in-line quick connector has a female connector body arranged to receive a male connector body in an interior cavity. The male connector body includes a bifurcated tubular member that includes resilient latching arms cooperable to engage latching members located within the interior cavity of the female connector body. The male connector body and female connector body each further include a raised annular flange. Fixed key members located on the male connector body flange engage slots located on the female connector body flange.

16 Claims, 2 Drawing Sheets

(56) References Cited

U.S. PATENT DOCUMENTS

| | | |
|---|---|---|
| 6,840,548 B2 | 1/2005 | Lacroix |
| 6,854,772 B2 | 2/2005 | Weller et al. |
| 6,988,747 B2 | 1/2006 | Allen |
| 7,401,818 B2 | 7/2008 | Takayanagi |
| 7,497,480 B2 | 3/2009 | Kerin |
| 7,837,234 B2 | 11/2010 | Yoshino |
| 8,177,772 B2 | 5/2012 | Christensen |
| 9,534,720 B2 | 1/2017 | Reasoner |
| 10,359,139 B2 | 7/2019 | Duck |
| 10,422,460 B2 | 9/2019 | Kujawski, Jr. |
| 2005/0110275 A1* | 5/2005 | Hama ................ F16L 37/0925 285/322 |
| 2006/0006643 A1 | 1/2006 | Schultz |
| 2008/0036206 A1* | 2/2008 | Li-guo ................ F16L 37/133 285/322 |
| 2010/0244438 A1 | 9/2010 | Johanson |
| 2014/0319823 A1* | 10/2014 | Happich .............. F16L 37/133 |
| 2017/0307120 A1* | 10/2017 | Guest ................. F16L 37/133 |

\* cited by examiner

IN-LINE QUICK CONNECTOR

TECHNICAL FIELD

This disclosure is generally directed to quick connectors. More specifically, it relates to an in-line quick connector for joining fluid carrying conduits.

BACKGROUND

Quick connectors are connector assemblies that allow for convenient, quick, fluid-tight connections between two or more conduits such as for example, pipes, tubes, or similar components. Quick connectors are commonly used in the automotive industry to connect tubing used in engine cooling line connections, fuel and brake connections, vapor connections or, more recently, in cooling circuits used to cool batteries of electric or hybrid vehicles. Quick connectors typically include a female connector for receiving a male connector, or a male connector for receiving a female connector. In operation, when fully disposed within the female connector, the male connector is locked in position allowing for leak-free fluid communication between a first tube in fluid communication with the female connector and a second tube in fluid communication with the male connector. A disadvantage with the quick connectors outlined above is that the latching elements for holding the male connector to the female connector are usually difficult to handle. It frequently happens that the components are not freely accessible within the location on a vehicle where the latching elements are installed so that the assembly procedure is faced with difficulties, caused by the fact that the space available is limited. Certain high-pressure fluid connections, such as, for example oil cooling and brake connections, are required to exhibit strong latching integrity as well as sealing reliability to remain connected and leak free. Quick connectors in these applications frequently require specialized latching components that require a high level of assembly and strong latching forces to fit the connection together.

It would be desirable to provide a low-profile, in-line quick connector for joining two fluid carrying conduits that can be easily assembled with the application moderate latching forces and without the requirement for specialized latching components.

SUMMARY

This disclosure relates to an in-line quick connector having a male and female connector body used for joining two fluid carrying conduits.

In a first example embodiment, an in-line connector assembly is disclosed comprising a male connector body having a head end extending axially from a first end of the male connector body. The head end including a plurality of arms with at least two of the plurality of arms comprising first and second latching arms with each first and second latching arm having an annular shoulder. A first flange extends radially from the connector body first end and has first and second key members extending from the first flange. A female connector body including a cavity with an opening is arranged to receive the head end in the cavity through the opening. First and second latching members that extend partially into the cavity engage the shoulder of each first second latching arm respectively, locking the head end in the female connector body when the head end is fully inserted into the cavity. A second flange extends radially from the female connector both at the open end and includes first and second slots that receive the first and second key members when the head end is fully inserted into the cavity.

In a second example embodiment, a method for making a fluid connection is disclosed comprising inserting a male connector body having a head end and first and second latching arms extending axially from the head end into a female connector body having a cavity through an opening for receiving the head end. The method includes engaging the first and second latching arms to first and second latching members extending partially into the cavity locking the male connector body to the female connector body. The method further includes joining first and second key members extending from the male connector body into first and a second slots on the female connector body when the head end is fully inserted into the cavity.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
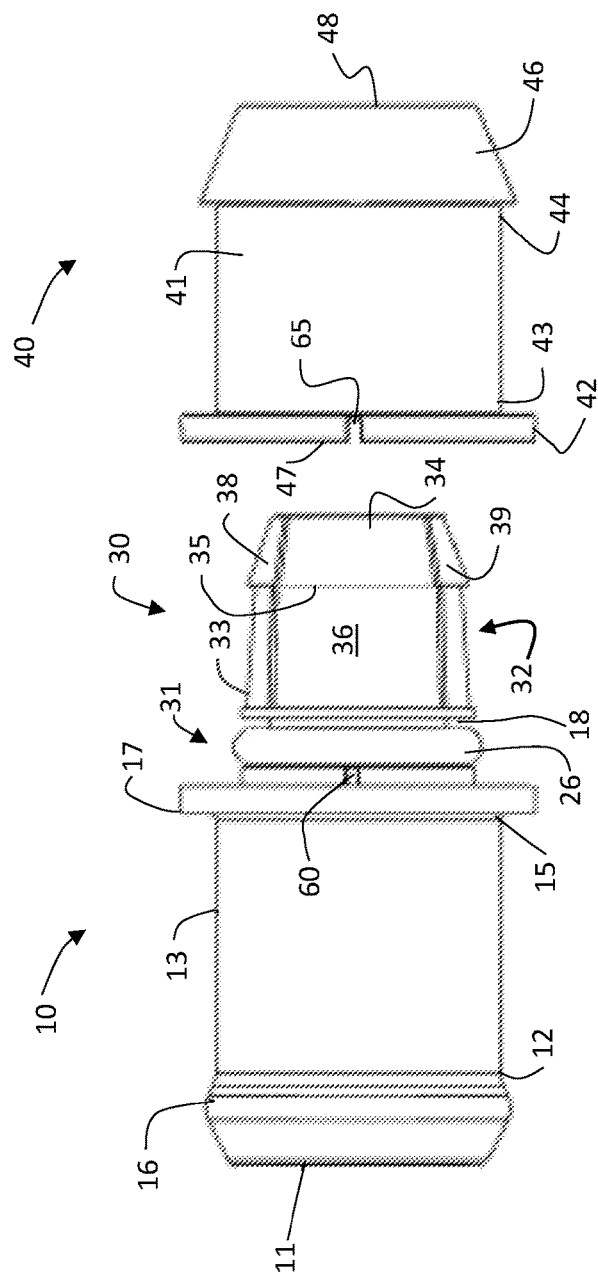
FIG. 1 is a side elevational view showing the in-line quick connector according to the example embodiment of the present disclosure.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In accordance with the principles of the present disclosure the foregoing and other objects are attained by an in-line quick connector for tubes, pipes, or hoses, for example for joining or connecting tubing used in engine cooling line connections, fuel and brake connections, vapor connections and the like.

An example embodiment of the inline quick connector comprises a male connector body and a female connector body for receiving the male connector body. Both the male and the female connector bodies each are further arranged to be connected with, for example, a conduit, a pipe, or a hose. The male connector body is adapted to be locked to the female connector body in a way as to be secured against forces acting axially thereon. The male connector body includes a bifurcated tubular member that includes resilient latching arms co-operable to engage latching members located within the interior cavity of the female connector body.

The male connector body further includes a raised annular flange extending about the periphery of the male connector body at a first end and further includes first and second fixed key members extending outward from the flange. The female connector body also includes a raised annular flange extending along the periphery of the female connector body at a first end that includes first, and second key slots set into the flange and sized to accept a respective first and second fixed key member therein.

The male connector body is arranged to be inserted into the female connector body internal cavity in an axial direction until the latching arms of the tubular member engage and grasp the latching members of the female connector body, locking the male connector body to the female connector body and preventing the quick connector from being pulled apart in the axial direction. When assembled the male connector body flange contacts and abuts against the female connector body flange with each first and second fixed key member inserted into a respective first and second key slot, preventing the male and female connector bodies from rotating around their longitudinal axis. As will be apparent by the disclosure, which is described in greater detail below, the example embodiment in the present disclosure provides a non-serviceable in-line quick connector which can be assembled together under the application of moderate assembly forces to provide a robust and permanent mechanical connection that can withstand axial pulling forces acting on the male and female connector bodies and to any pressure surges acting on the quick connector by the fluid conveyed by connected fluid pipe or hose.

Figure 3:
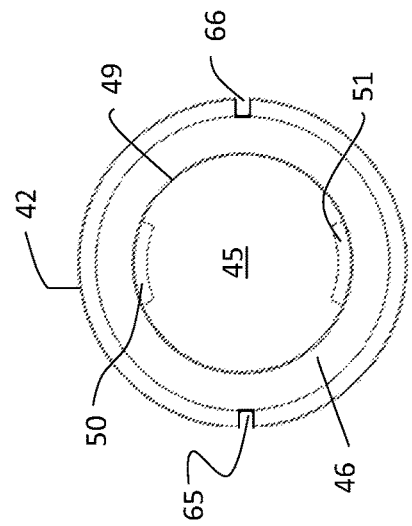
FIG. 3 is a front elevational view of the female connector body of the in-line quick connector according to the example embodiment of the present disclosure.
Figure 2:
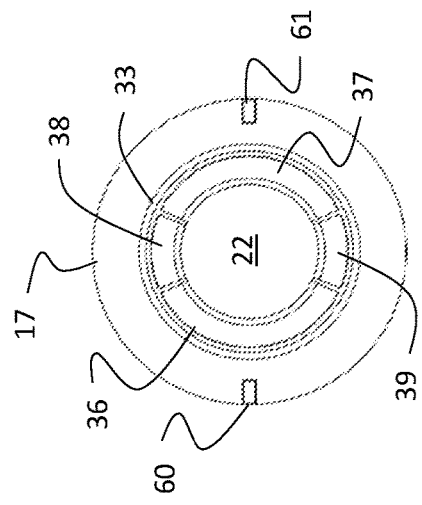
FIG. 2 is a front elevational view of the male connector body of the in-line quick connector according to the example embodiment of present disclosure.

Turning now to FIGS. 1-3, the in-line quick connector an example embodiment of the present disclosure is illustrated. The in-line quick connector is comprised of a male connector body 10 and a female connector body 40. Male connector body 10 is comprised of a cylindrical member 13 having a generally constant diameter from a first end portion 15 to a second end portion 12. The second end portion 12 includes a raised annular projection 16 extending radially outward from cylindrical member 13. The first end portion 15 includes a first raised annular flange 17 that extends radially outward from cylindrical member 13. Male connector body 10 is generally made of a plastic material, such as for example a thermoplastic or nylon, however metallic material may also be employed. Male connector body 10 includes a cylindrical internal cavity 20, best seen at FIG. 4, extending from first end portion 15 to opening 11.

With renewed reference to FIG. 1, a conduit, for example, a plastic pipe or rubber hose made to convey a fluid (not shown) is arranged to be installed over cylindrical member 13 from the second end portion 12 to first flange 17. Raised projection 16 provides a friction fit against the internal surface of the installed conduit retaining the conduit on the male connector body 10 and sealing the conduit to cylindrical member 13 to prevent fluid leaks. With the conduit installed on the male connector body 10 a fluid connection is made between the conduit and internal cavity 20, through opening 11 allowing for fluid transfer between the conduit and the male connector body 10. In other embodiments, the cylindrical member 13 and first flange 17 could be formed as an endform of a plastic or metal conduit that extends from an end of the conduit.

The male connector body 10 further includes a head end 30 comprised of an annular sealing section 31 and a bifurcated tubular member 32. The sealing section 31 has an overall diameter that is smaller than the diameter of cylindrical member 13 and extends axially outward from first flange 17. The sealing section 31 includes a groove 18 that retains a seal member 26 therein, such as for example, an O-ring.

The tubular member 32 is bifurcated into two sets of arms. The first set of arms includes identical arms 36 and 37. Each arm 36 and 37 extends along the frame portion 33 and head portion 34 and are located on opposite sides from each other. A second set of arms includes identical arms 38 and 39 extending along the frame portion 33 and head portion 34 and are located on opposite sides from each other. Arms 36 and 37 have a width that is greater than the second set of arms 38 and 39.

The tubular member 32 is bi-furcated into two sets of arms. The first set of arms includes identical arms 36 and 37. Each arm 36 and 37 extends along the frame portion 33 and head portion 34 and are located on opposite sides from each other. A second set of arms includes identical arms 38 and 39 extending along the frame portion 33 and head portion 34 and are located on opposite sides from each other. Arms 36 and 37 have a width that is greater than the second set of arms 38 and 39.

As can best be seen at FIG. 2, arms 38 and 39, due to their smaller width and therefore lack of material forming the arms have greater elastic flexibility and can bend easier than arms 36 and 37. Arms 38 and 39 are sized to provide an elastic flexibility to allow installation of the male connector body to the female connector body by hand using a moderate latching force and without the requirement for specialized latching tools. Arms 38 and 39 together form latching members that engage latching surfaces located in the internal cavity of female connector body 40 and which will be explained in detail below. As can be best seen in FIG. 4 a centrally located cylindrical cavity 22 extends through tubular member 32. The internal cavity 22 extends into and through tubular member 32 at a reduced diameter from cavity 20. As is shown in FIG. 4, cylindrical cavity 20 does not have a constant diameter between second end portion 12 and first end portion 15 and tapers inward to form a conical cavity 21 that meets the reduced diameter of cavity 22.

With renewed reference to FIGS. 1 and 3 the female connector body 40 of the of the present disclosure is illustrated. The female connector body 40 includes a cylindrical member 41 having a second flange 42 radially projecting outward from a first end 43 of cylindrical member 41. Second flange 42 has a diameter equal to the diameter of the first flange 17. A conical frustum projection 46 extends radially outward from a second end 44 of the cylindrical member 41. The female connector body 40 includes an internally located cylindrical cavity 45 extending through the female connector body 40 from an opening 47 at flange 42, to an exit 48 at projection 46. Cavity 45 has an internal diameter arranged to accept within the cavity 45 the head end 30 of male connector body 10 and has a diameter sized to accept male connector body 10 and provide a proper seal compression.

A conduit, for example, a plastic pipe or rubber hose that either conveys or receives a fluid therein (not shown) is arranged to be installed over cylindrical member 41 over projection 46 to rest against flange 42. Projection 46 provides a friction fit against the internal surface of the installed conduit retaining the conduit to cylindrical member 41 and sealing the conduit against the projection 46 to prevent fluid leaks. With the conduit installed on the female connector body 40 a fluid connection is made between the conduit and cavity 45, via exit 48 allowing for fluid transfer between the conduit and the female connector body 40.

Figure 4:
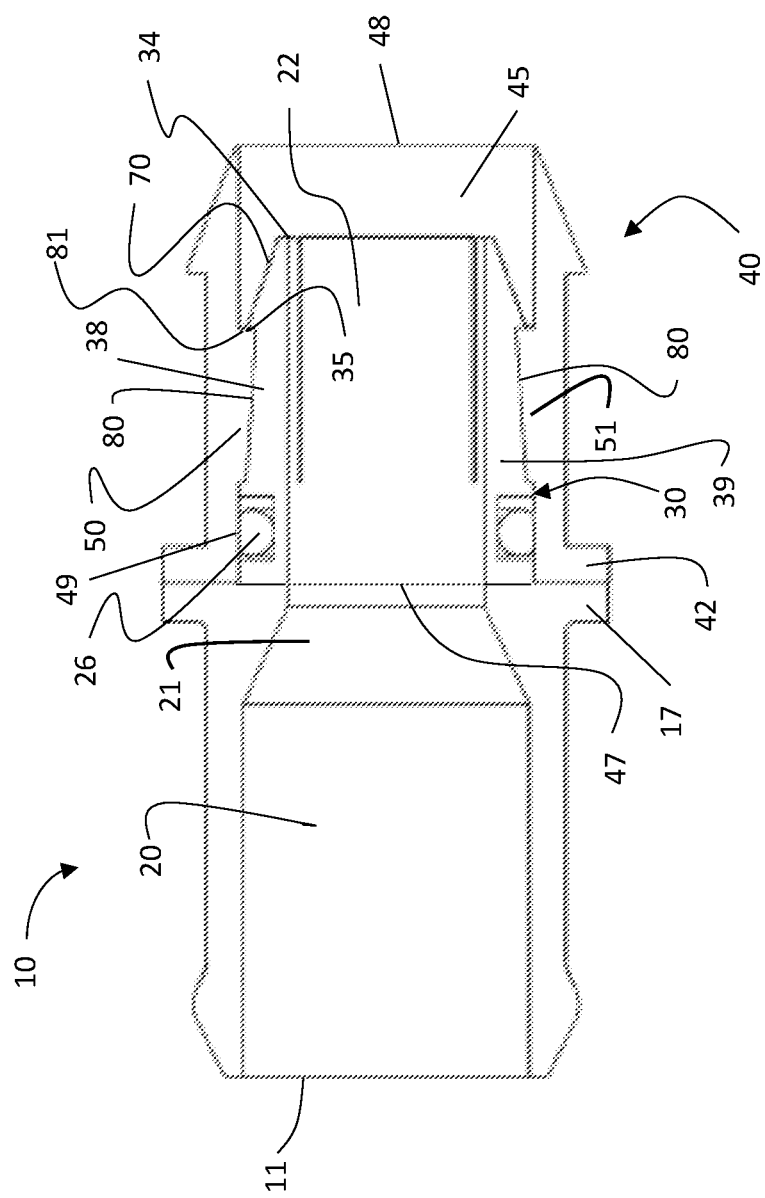
FIG. 4 is a sectional view showing the assembled in-line quick connector in a connected state according to the example embodiment of present disclosure.

As can be best seen at FIGS. 3 and 4, first and second latching members 50 and 51 partially extend into the cavity 45 from an internal cavity surface 49. The first and second latching members 50 and 51 are positioned to be engaged and grasped by arms 38 and 39 when head portion 30 is installed into the female connector body 40.

First and second anti-rotation key members 60 and 61 extend from first flange 17 and are arranged to be installed within complementary first and second key slots 65 and 66 located on second flange 42. When the male connector body is installed to the female connector body, the key members provide proper orientation to align latching arms 38 and 39 to grasp latching members 50 and 51. Upon latching of the male connector body 10 to the female connector body 40, first and second key members 60 and 61 enter first and second key slots 65 and 66, respectively and prevent the male and female connector bodies from rotating around their longitudinal axis.

FIG. 4 illustrates a sectional view of the assembled in-line quick connector of the example embodiment. As was explained above, the female connector body 40 cavity 45 has an internal cylindrical diameter arranged to accept the male connector head end 30 therein. The head portion 34 is inserted into opening 47 with the first and second key members 60, 61 aligned with its associated first and second key slot 65, 66 (not shown in FIG. 4). The alignment of the key members to the key slots also align latching arms 38 and 39 with their associated latching member 50 and 51.

The engagement of latching arms 38 and 39 to its associated latching member 50 and 51 will now be explained using latching arm 38 and latching member 50. It will be appreciated by those skilled in the art that latching arm 39 engages its associated latching member 51 in the same manner as latching arm 38 to latching member 50.

As the head portion 34 is further inserted into cavity 45, sloped surface 70 of head portion 34 meets inclined surface 80 of latching member 50. As sloped surface 70 travels along inclined surface 80, latching arm 38 is elastically deformed away from latching member 50. The elastic deformation of arm 38 continues until latching arm 38 is elastically restored by falling-off the ramped surface 80, allowing latching arm 38 to rest on inclined surface 80 and shoulder 35 to engage against wall 81 grasping latching member 50.

Latching arm 39 follows the same process explained above grasping latching member 51 at the same time as latching arm 38 locking the male connector body 10 to female connector body 40. Also at the same time, seal member 26 contacts surface 49 of cavity 45 and by utilizing elastic deformation, provides a liquid tight seal between the male and female connector body.

With the latching aims 38 and 39 grasping latching members 50 and 51, first and second flanges 17 and 42 are butted against each other which stops further movement of the male connector body 10 into the female connector body 40. The locking of the latching arms 38 and 39 to latching members 50 and 51 prevent the male connector body 10 from being pulled axially out of the female connector body 40.

As was explained earlier, first and second anti-rotation key members 60 and 61 extending from flange 17 enter a respective first and second key slot 65 and 66 located on second flange 42 upon the locking of the male connector body 10 to the female connector body 40. The installed key members prevent the male and female connector bodies from rotating laterally around the connector's longitudinal axis. In this connected state, fluid conduits connected to the connector bodies 10 and 40 can transfer fluids through the in-line quick connector from one conduit to the other.

With the male connector body 10 locked to the female connector body 40, the in-line quick connector is in a permanent and non-serviceable connected state. That is, the male connector body 10 cannot be removed from its connected state with the female connector body 40 without destroying the in-line quick connector.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or system within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An in-line connector assembly comprising:
   a male connector body having a head end extending axially from a first end of the male connector body, the head end including a sealing section having a groove retaining a seal member in the groove and first and second latching arms, each first and second latching arm having an annular shoulder;
   a first flange extending radially from the connector body first end having first and second key members extending from the first flange;
   a female connector body including a cavity with an opening for receiving the head end;
   first and second latching members extending partially into the cavity to engage the shoulder of each first second latching arm respectively, locking the head end in the female connector body and the seal member to contact the cavity when the head end is inserted into the cavity; and
   a second flange extending radially from the female connector body at the opening, the second flange including first and second slots that receive the first and second key members.

2. The in-line connector assembly of claim 1, wherein the head end includes a bifurcated tubular member extending axially from the sealing section from a first generally conical shaped frame portion to a second conical shaped head portion the frame portion tapering slightly inward from the sealing section to the base of the head portion.

3. The in-line connector assembly of claim 2, wherein the bifurcated tubular member comprises;
   a first set of arms extending along the frame portion and head portion of the head end on opposite sides from each other; and
   a second set of arms comprising the first and second latching arms extending along the frame portion and head portion of the head end on opposite sides from each other orthogonally from the first set of arms,
   wherein the head portion has a diameter that is greater than of the frame portion where it transitions to the head portion forming the annular shoulder along the first set of arms and the first and second latching arms.

4. The in-line connector assembly of claim 3, wherein the first and second latching arms have a lateral width less than the first set of arms and thereby having a greater elastic flexibility.

5. The in-line connector assembly of claim 3, wherein each of the first and second latching members includes a wall whereby each shoulder grasps the wall of a respective first and second latching member to lock the head end to the female connector body when the head end is fully inserted into the cavity.

6. The in-line connector assembly of claim 2, wherein the male connector body further includes a cylindrical member and a cylindrical cavity extending internally through the cylindrical member from an opening at a second end portion of the cylindrical member through the sealing section and the tubular member.

7. The in-line connector assembly of claim 1, wherein the male connector body includes:
a raised annular projection extending radially outward from the second end portion of the male connector body cylindrical member arranged to be accepted within a conduit installed on the male connector body cylindrical member retaining and sealing the conduit on the male connector body cylindrical member.

8. The in-line connector assembly of claim 1, wherein the female connector body includes:
a cylindrical member having the cavity extending through the female connector body cylindrical member from an opening to an exit;
a conical projection extending radially outward from a second end of the female connector body cylindrical member, arranged to be accepted within a conduit installed on the female connector body cylindrical member retaining and sealing the conduit on the female connector body cylindrical member.

9. The in-line connector assembly of claim 1, wherein the first and second flanges are equal in diameter and contact each other when the head end is fully inserted into the cavity.

10. A method for making a fluid connection comprising:
inserting a male connector body having a head end having a sealing section that includes a groove that retains a seal member in the groove and first and second latching arms extending axially from the head end into a female connector body having a cavity through an opening for receiving the head end;
engaging the first and second latching arms to first and second latching members extending partially into the cavity locking the male connector body in the female connector body and the seal member to contact the cavity; and
joining a first and a second key member extending from the male connector body into a first and a second slot on the female connector body when the head end is inserted into the cavity.

11. The method of 10, wherein each of the first and second latching members includes a wall and each first and second latching arm includes a shoulder, the method further including:
grasping by each shoulder the wall of a respective first and second latching member to lock the head end to the female connector body when the head end is fully inserted into the cavity.

12. The method of claim 11, wherein the male connector body further includes a cylindrical member and a cylindrical cavity extending internally through the cylindrical member from an opening at a second end portion of the cylindrical member through the sealing section; and
providing a raised annular projection extending radially outward from the second end portion of the male connector body cylindrical member, arranged to be accepted within a conduit installed on the male connector body cylindrical member retaining and sealing the conduit to the male connector body cylindrical member and allowing a fluid to enter or exit the male connector body cavity opening.

13. The method of claim 11, wherein the female connector body includes a cylindrical member having a centrally located cavity extending through the female connector body cylindrical member from an opening to an exit; and
providing a conical projection extending radially outward from a second end of the female connector body cylindrical member, arranged to be accepted within a conduit installed on the female connector body cylindrical member retaining and sealing the conduit to the female connector body cylindrical member allowing a fluid to enter or exit from the cavity exit to the conduit.

14. The method of claim 10, wherein the male connector body includes a first flange extending radially from a first end of the male connector body the first and second key members extending from the first flange;
a second flange extending radially from the opening of the female connector body, the second flange including the first and second slots;
wherein the first and second key members are accepted in the first and second slots when the head end is fully inserted into the cavity.

15. The method of claim 14, wherein the first and second flanges are equal in diameter and contact each other when the head end is fully inserted into the cavity.

16. A connector comprising:
a male connector body having a head end extending axially from a first end of the male connector body, the head end including a seal member and a bifurcated tubular member having at least one pair of arms with an annular shoulder extending about a periphery of the at least one pair of arms, the bifurcated tubular member extending axially from the seal member from a first generally conical shaped frame portion to a second conical shaped head portion tapering slightly inward from the sealing section to the base of the head portion;
a first flange extending radially from the connector body having first and second key members extending from the first flange;
a female connector body including a cavity for receiving the head end;
a pair of latching members extending partially into the cavity arranged to engage the shoulder of each arm of the at least one pair of arms to lock the head end in the female connector body and the seal member to contact the cavity when the head end is inserted into the cavity; and
a second flange extending radially from the female connector body, the second. flange including first and second slots that receive the first and second key members.

* * * * *